Aug. 31, 1943.  R. W. DAVIS ET AL  2,328,427
FRUIT AND VEGETABLE BASKET AND COVER
Filed April 1, 1942   2 Sheets-Sheet 1
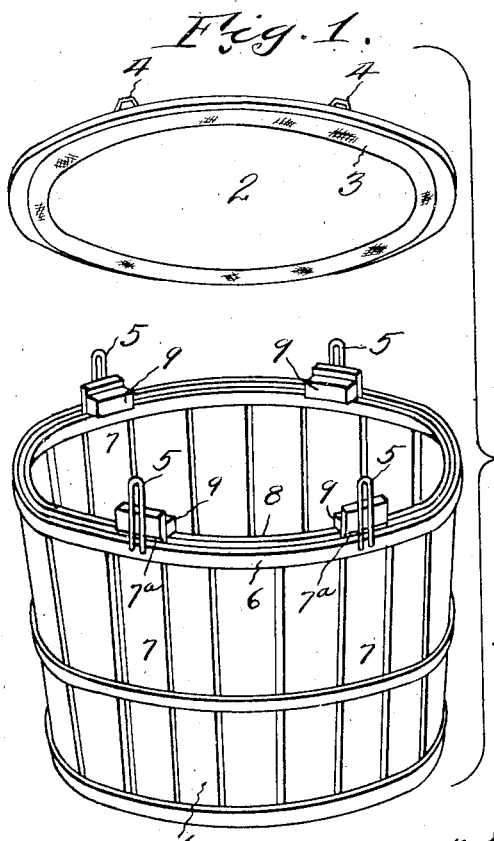
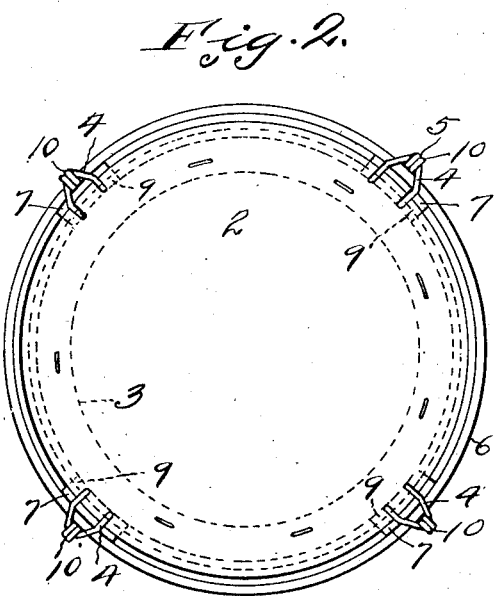
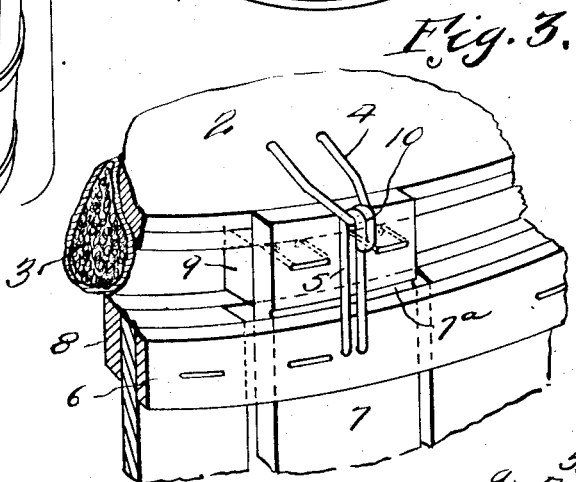
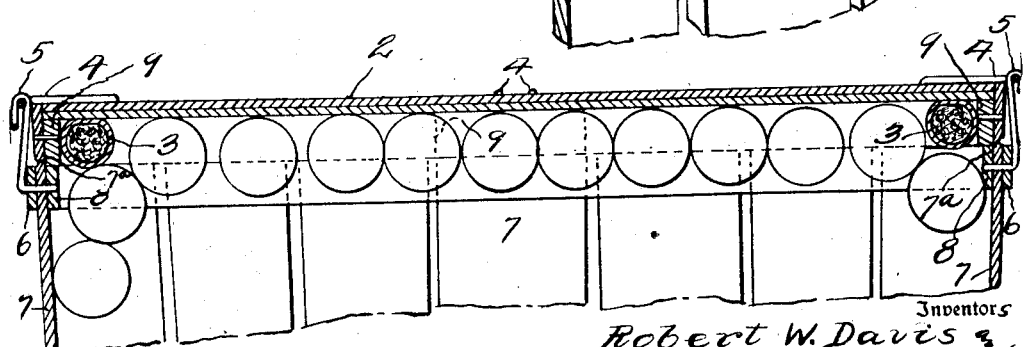
Inventors
Robert W. Davis
Elof R. Leonard
By Philip A. H. Terrell
Attorney

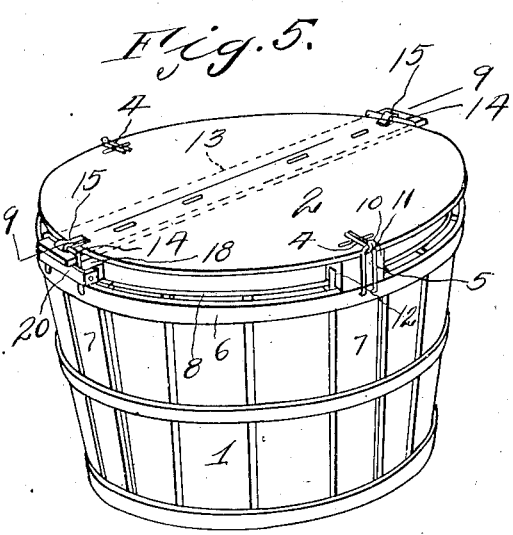

Patented Aug. 31, 1943

2,328,427

UNITED STATES PATENT OFFICE 2,328,427

FRUIT AND VEGETABLE BASKET AND COVER

Robert W. Davis and Elof R. Leonard, Bethesda, Md.

Application April 1, 1942, Serial No. 437,248

9 Claims. (Cl. 217—124)

The invention relates to covers for fruit and vegetable baskets of the type in which these articles are stored and shipped, and has for its object to provide a device of this kind wherein the cover is raised above the top of the body of the basket; thereby allowing overfilling as is the present custom, and at the same time allowing the cover to remain flat so a plurality of baskets can be stacked, and the overfilled portion of the basket will settle into the basket incident to the jarring during shipment, thereby insuring a full measure in the basket when the cover is removed for display and vending purposes.

A further object is to extend a plurality of the staves of the basket upwardly above the top forming supporting means for spacer blocks interposed between the top of the basket and cover.

A further object is to provide a packer ring between the cover and the fruit for closing the spaces between the spacer blocks around the upper end of the basket.

A further object is to secure the spacer blocks to the inner sides of the staves, extending above the upper hoops of the basket, and to provide securing means carried by the cover and basket, and extending over the portions of the staves extending above the upper end of the basket.

A further object is to mount some of the blocks on the arms of the U-shaped handles, thereby facilitating assembling of these blocks.

A further object is to provide the portions of the staves extending above the top of the basket with weakened portions so these portions can be broken off after the removal of the cover and the open baskets are placed on display.

A further object is to provide the under side of the cover with spaced spacer blocks having channels into which channels the upper ends of the spaced staves extend above the upper side of the basket for preventing inward or outward movement of the walls of the basket, and also to provide means for anchoring the cover to the basket.

A further object is to provide a fruit and vegetable basket having a flat cover, thereby allowing the basket to be stacked without injury to the fruit, incident to the weight of superimposed baskets.

With the above and other objects in view the invention resides in the combination and arrangement of parts as hereinafter set forth, shown in the drawings, described and claimed, it being understood that changes in the precise embodiment of the invention may be made without departing in the scope of what is claimed without departing from the spirit of the invention.

In the drawings:

Figure 1 is a collective perspective view of the basket and cover, showing the parts in position to be assembled.

Figure 2 is a top plan view of the cover and basket.

Figure 3 is an enlarged detail perspective view of a portion of the cover and a portion of the wall of the basket.

Figure 4 is a vertical transverse sectional view through the upper portion of the basket.

Figure 5 is a perspective view of a modified form of basket and cover showing channeled spacer blocks.

Figure 6 is a plan view of the inner side of the cover, of the type shown in Figure 5.

Figure 7 is a top plan view of the basket body shown in Figure 5 with the cover removed.

Figure 8 is a detail perspective view of one of the blocks mounted on one of the handle members.

Figure 9 is a vertical transverse sectional view taken on line 9—9 of Figure 5.

Figure 10 is a side elevation of a plurality of baskets, showing how they can be arranged and stacked for shipping purposes.

Referring to the drawings, and particularly to Figures 1 to 4, the numeral 1 designates the body of the basket and 2 the cover. The cover 2 is preferably laminated, and when in position, with the basket packed, is flat, to facilitate stacking, as shown in Figure 10, which is not possible in as conventional basket covers where the basket is overfilled and the top bowed and secured to the upper end of the basket.

Secured to the under side of the cover 2, adjacent its periphery, is an annular packing member 3, which may be formed from twisted paper, or paper having an excelsior core. Applicants do not limit themselves in this particular.

Anchored to the upper side of the cover 2, at spaced points, are fastening wire loops 4, adapted to be interlocked with the anchoring loops 5 carried by the outer hoop 6 at the upper end of the body 1 for securing the cover in place.

Spaced staves 7 of the body 1 extend upwardly above the hoop 6 and the inner hoop 8, clearly shown in Figure 1, and the portions thereof above the hoops 6 and 8 have secured to their inner sides spacer blocks 9 on which the cover 2 rests, and at which time portions of said staves overlie the periphery of the cover 2, hence it will be seen that inward collapsing of the body is prevented, and at the same time it will also be seen that when the wire loops 4 and 5 are interengaged as shown at 10 in Figure 3, over the upper ends of the staves 7 outward collapsing of the wall is positively prevented. There is a decided advantage in raising the cover 2 above the upper end of the body 1; for instance, it is well known that after a bushel basket is filled and shipped, the fruit or vegetables therein settle, often to a position below the upper end of the basket, consequently causing a short measure, and purchasers refuse the same. By raising the basket cover and providing an over fill as shown in Figure 4, it will be seen that the contents settle and the cover eventually removed for display or vending purposes, the basket will be full to the top of the hoops 6 and 8 and the contents will not be damaged on top incident to the pressure of conventional bowed tops. It will be noted that the annular packing member 3 will close the spaces circumferentially between the portions of the staves 7, above the hoops 6 and 8, therefore the fruit will not be damaged, the foreign matter will be excluded. The upper ends of the staves 7, adjacent the hoops 6 and 8, are provided with scored places 7a extending entirely across the staves so that when the cover is removed and the baskets used for display, the portions of the staves above the hoops may be broken away.

Referring to Figures 5 to 9 inclusive, wherein a modified form of cover is shown, the under side of the cover 2, at opposite sides thereof, has secured thereto channeled spacing blocks 11 in the channels 12 of which the upper ends of the staves 7, above the hoops 6 and 8, are received. These blocks rest on the upper sides of the hoops 6 and 8. By providing a channeled interengagement, it will be seen that inward and outward movement of the wall of the body is prevented, and at the same time a flat cover is provided so that fruit will not be damaged when the baskets are superimposed, and the baskets will not rock, one on the other, as is now the difficulty experienced with the convexed covers.

The under side of cover 2 is preferably provided with a batten or handle slat 13 which braces the cover, and adapted to have its ends pass through the wire handle loops 14 carried by the outer hoop 6 and to be secured within said loops by pliable metal clips 15 carried by the cover and which are bent upwardly and inwardly over the transverse portions 16 of the loops 14, clearly shown in Figure 9. Secured to the arms 17 of the handle loops 14 and resting on the upper edge of the basket are spacer blocks 18. These spacer blocks are provided with recesses 19 for the reception of the arms 17 and the blocks are secured to the arms by a metallic strap 20 having its ends 21 bent over the ends of the blocks and secured thereto at 22, therefore it will be seen that spacer blocks 18 can be easily placed in position and removed when desired. The ends of the batten 13 extend through the loops 14 above the spacer blocks 18; otherwise the construction and operation is the same as in the form shown in Figures 1 to 4 inclusive.

Figure 10 shows a diagrammatic view of the system of stacking the baskets so they will occupy the minimum amount of space and may be stacked as high as desired, made possible by the flat covers and the rigid construction.

This stacking is not readily possible with baskets as at present constructed, because the baskets are bowed and when stacked high will wobble and the weight of superimposed baskets is directly on the fruit. In the present device it will be noted that the weight of superimposed baskets is distributed onto the body walls and not on the fruit.

From the above it will be seen that a fruit basket cover is provided which is simple in construction, flat when in place on an over-filled basket, and one in which the fruit may settle to its proper content measurement, and there will not be short weight or measurement when the cover is removed from the basket for display and vending purposes. The purchasing public refuses baskets which are not full and the top fruit damaged.

The invention having been set forth what is claimed as new and useful is:

1. In combination with a basket, a cover for said basket, means for supporting said basket cover spaced upwardly from the upper end of the basket, means for securing said cover to the basket, said basket being formed from staves, spaced staves extending above the upper end of the basket, said means for supporting the cover spaced from the upper end of the basket comprising spacer members carried by the inner sides of the staves and of less height than the portions of the staves above the upper end of the basket, said staves overlying the periphery of the cover.

2. The combination with the upper end of a stave basket, a cover for said basket, of means for supporting said cover spaced from the upper end of the basket, said means comprising ends of spaced staves extending above the basket and overlying the periphery of the cover and spacer blocks carried by the inner sides of said portions of the staves above the upper end of the basket and on which the cover rests.

3. A device as set forth in claim 2 including separable fastener means carried by the cover and upper end of the basket and extending over the portions of the staves above the upper end of the basket.

4. A device as set forth in claim 2 including a packer ring carried by the cover and adapted to close the spaces between the portions of the staves above the upper end of the cover.

5. The combination with the upper end of the body of a basket, a cover for the basket in spaced relation to said upper end, of a connection between said cover and basket, said connection comprising spacer blocks, interengaging means between the spacer blocks and the upper end of the basket, means for securing said cover to said basket and maintaining the interengaging means said interengaging means comprising channeled blocks carried by the cover at spaced points and spaced members carried by the upper end of the basket and disposed in the channels of said blocks.

6. The combination with the upper end of the body of a basket, a cover for said basket in spaced relation to said upper end, of a connection between said cover and basket, said connection comprising spacer blocks, interengaging means between the spacer blocks and the upper end of the basket, means for securing said cover to said basket and maintaining the interengaging means, said basket being formed from a plurality of staves, said interengaging means comprising portions of spaced staves extending above the body, channeled blocks carried by the under side of the cover and in which the portions of the staves above the basket are disposed and a packer ring carried by the under side of the cover and forming means for protecting the fruit at the spaces between the blocks.

7. The combination with a basket having oppositely disposed U-shaped handles extending above the basket, a cover for said basket in spaced relation thereto, of means for attaching said cover to said basket and supporting the same in spaced relation thereto, said means comprising spacer blocks interposed between the cover and basket and attached to the U-shaped handle members.

8. A device as set forth in claim 7 wherein the connection between the blocks and handle members comprises members carried by the block and extending around the arms of the handle members.

9. A device as set forth in claim 7 including extensions carried by the cover and extending outwardly over the spacer blocks beneath the transverse portions of the handle members, and means for anchoring said extensions to the transverse portions of the handle members.

ROBERT W. DAVIS.
ELOF R. LEONARD.